US012591702B2

(12) United States Patent
Landenbach et al.

(10) Patent No.: US 12,591,702 B2
(45) Date of Patent: Mar. 31, 2026

(54) PERMISSION TRANSLATOR

(71) Applicant: Infineon Technologies AG, Neubiberg (DE)

(72) Inventors: Richard Landenbach, Langen, DE (US); Kai Dieffenbach, Egelsbach (DE); Uwe Moslehner, Geiselbach (DE)

(73) Assignee: Infineon Technologies AG, Neubiberg (DE)

( * ) Notice: Subject to any disclaimer, the term of this patent is extended or adjusted under 35 U.S.C. 154(b) by 89 days.

(21) Appl. No.: 18/657,897

(22) Filed: May 8, 2024

(65) Prior Publication Data

US 2025/0348608 A1      Nov. 13, 2025

(51) Int. Cl.
*G06F 21/62*          (2013.01)
(52) U.S. Cl.
CPC ................................ *G06F 21/6218* (2013.01)
(58) Field of Classification Search
CPC .................................................. G06F 21/6218
See application file for complete search history.

(56) References Cited

U.S. PATENT DOCUMENTS

| | | | | |
|---|---|---|---|---|
| 8,825,984 | B1 * | 9/2014 | Srinivasan | G06F 12/109 |
| | | | | 711/206 |
| 10,338,665 | B2 * | 7/2019 | Balasubramanian | |
| | | | | G06F 1/3243 |
| 11,030,113 | B1 * | 6/2021 | Durham | G06F 12/1027 |

| | | | | |
|---|---|---|---|---|
| 11,288,404 | B2 * | 3/2022 | Mayer | G06F 21/74 |
| 11,822,703 | B2 * | 11/2023 | Khan | G06F 21/6218 |
| 11,921,869 | B1 * | 3/2024 | Peterson | G06F 21/6218 |
| 2009/0138623 | A1 * | 5/2009 | Bosch | G06F 21/74 |
| | | | | 710/14 |
| 2009/0158107 | A1 * | 6/2009 | Mayer | G06F 11/267 |
| | | | | 714/E11.169 |
| 2015/0067369 | A1 * | 3/2015 | Henry | G06F 1/3287 |
| | | | | 713/323 |
| 2015/0371017 | A1 * | 12/2015 | Craske | G06F 21/554 |
| | | | | 726/21 |
| 2016/0364343 | A1 * | 12/2016 | Case | G06F 12/145 |
| 2017/0076116 | A1 * | 3/2017 | Chen | G06F 21/554 |
| 2019/0391814 | A1 * | 12/2019 | Warkentin | G06F 12/1491 |
| 2021/0073144 | A1 * | 3/2021 | Guo | G06F 9/45558 |
| 2024/0044979 | A1 * | 2/2024 | Talvitie | G06F 11/3656 |

(Continued)

*Primary Examiner* — Gary S Gracia

(74) *Attorney, Agent, or Firm* — Eschweiler & Potashnik, LLC

(57) ABSTRACT

Systems, methods, and circuitries are provided for translating permission identifiers in bus access transactions. In one example, a processing system includes a source system element characterized by a plurality of source privilege levels; a destination system element characterized by a plurality of destination privilege levels; and translator circuitry coupled between the source system element and the destination system element. The translation circuitry includes an input and an output. The input is coupled to the source system element that inputs a bus access transaction, where the bus access transaction includes a source permission identifier indicating a source privilege level. The output coupled is to the destination system element. The output provides a modified bus access transaction in which the source permission identifier is replaced with a destination permission identifier indicating a destination privilege level mapped to the source privilege level.

19 Claims, 6 Drawing Sheets

(56)　　　　　References Cited

U.S. PATENT DOCUMENTS

| | | | |
|---|---|---|---|
| 2024/0070071 A1* | 2/2024 | Swaine | ............... G06F 12/0811 |
| 2025/0156086 A1* | 5/2025 | Chadwick | ............. G06F 12/145 |

* cited by examiner

100

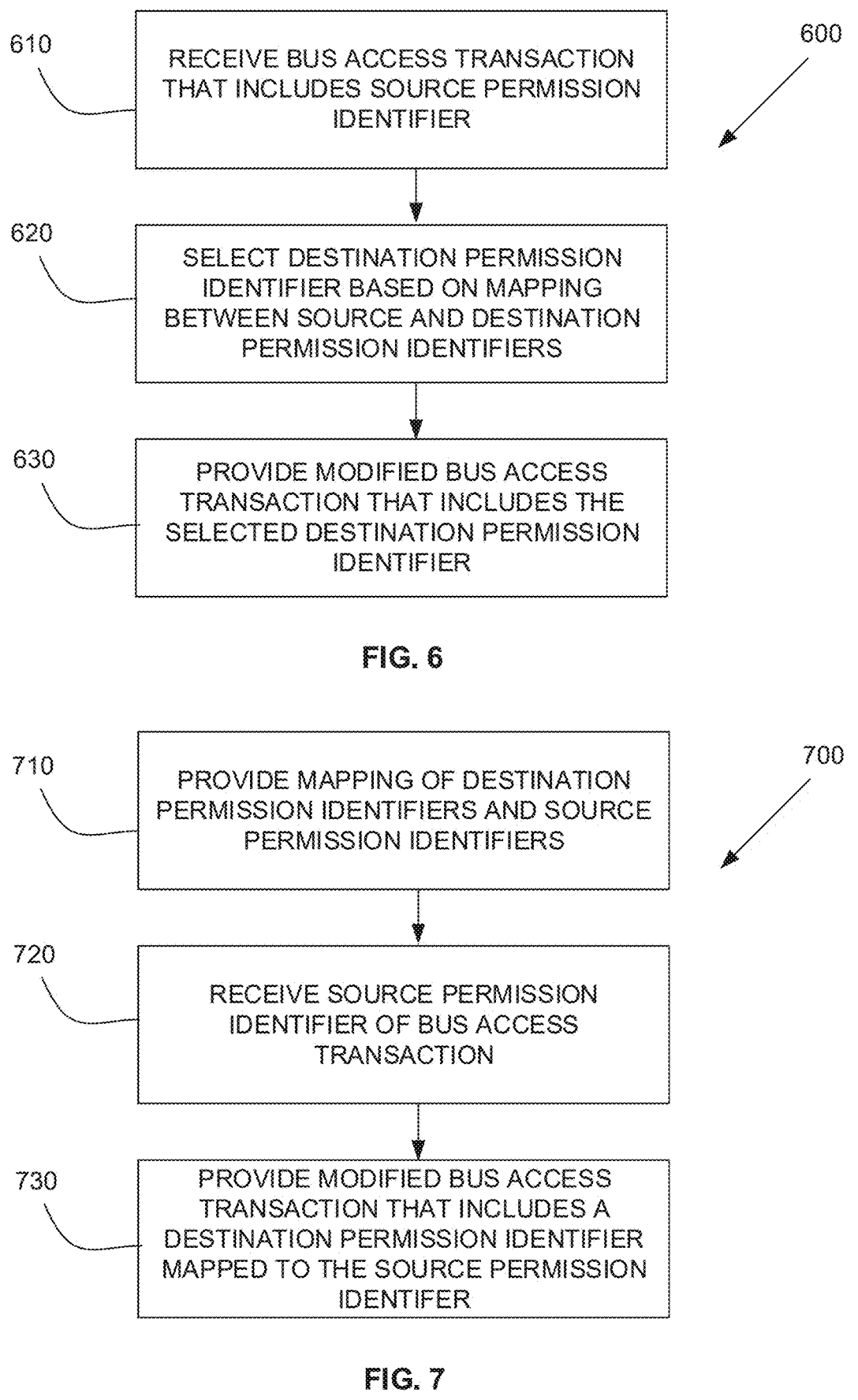

610       RECEIVE BUS ACCESS TRANSACTION THAT INCLUDES SOURCE PERMISSION IDENTIFIER

600

620       SELECT DESTINATION PERMISSION IDENTIFIER BASED ON MAPPING BETWEEN SOURCE AND DESTINATION PERMISSION IDENTIFIERS

630       PROVIDE MODIFIED BUS ACCESS TRANSACTION THAT INCLUDES THE SELECTED DESTINATION PERMISSION IDENTIFIER

FIG. 6

710       PROVIDE MAPPING OF DESTINATION PERMISSION IDENTIFIERS AND SOURCE PERMISSION IDENTIFIERS

700

720       RECEIVE SOURCE PERMISSION IDENTIFIER OF BUS ACCESS TRANSACTION

730       PROVIDE MODIFIED BUS ACCESS TRANSACTION THAT INCLUDES A DESTINATION PERMISSION IDENTIFIER MAPPED TO THE SOURCE PERMISSION IDENTIFER

FIG. 7

PERMISSION TRANSLATOR

FIELD

The present disclosure relates generally to the field of processors and central processing units (CPUs) and more particularly to an access control system for a processing system that includes system elements that have different permission schemes.

BACKGROUND

Modern microcontroller systems may include heterogeneous CPU types. For example, on a single die, a microcontroller unit (MCU) may include a number of different blocks, which may include different kinds of CPUs, for example, Tricore and RISC-V. Such cores may have different and not necessarily compatible permission privilege schemes. Another example of heterogeneous CPU types in MCUs may include system in a package (SIP) architectures in which an interconnect structure controls access to shared resources by system elements as central processing units (CPUs), processing cores, virtual machines, and so on that are implemented on multiple silicon dies.

BRIEF DESCRIPTION OF THE DRAWINGS

Some examples of circuits, apparatuses and/or methods will be described in the following by way of example only. In this context, reference will be made to the accompanying Figures.

FIG. 6 is a flow diagram outlining an example method for processing a bus access transaction according to different permission schemes, in accordance with various aspects described.

FIG. 7 is a flow diagram outlining an example method for translating permission identifiers in a bus access transaction, in accordance with various aspects described.

DETAILED DESCRIPTION

Figure 1:
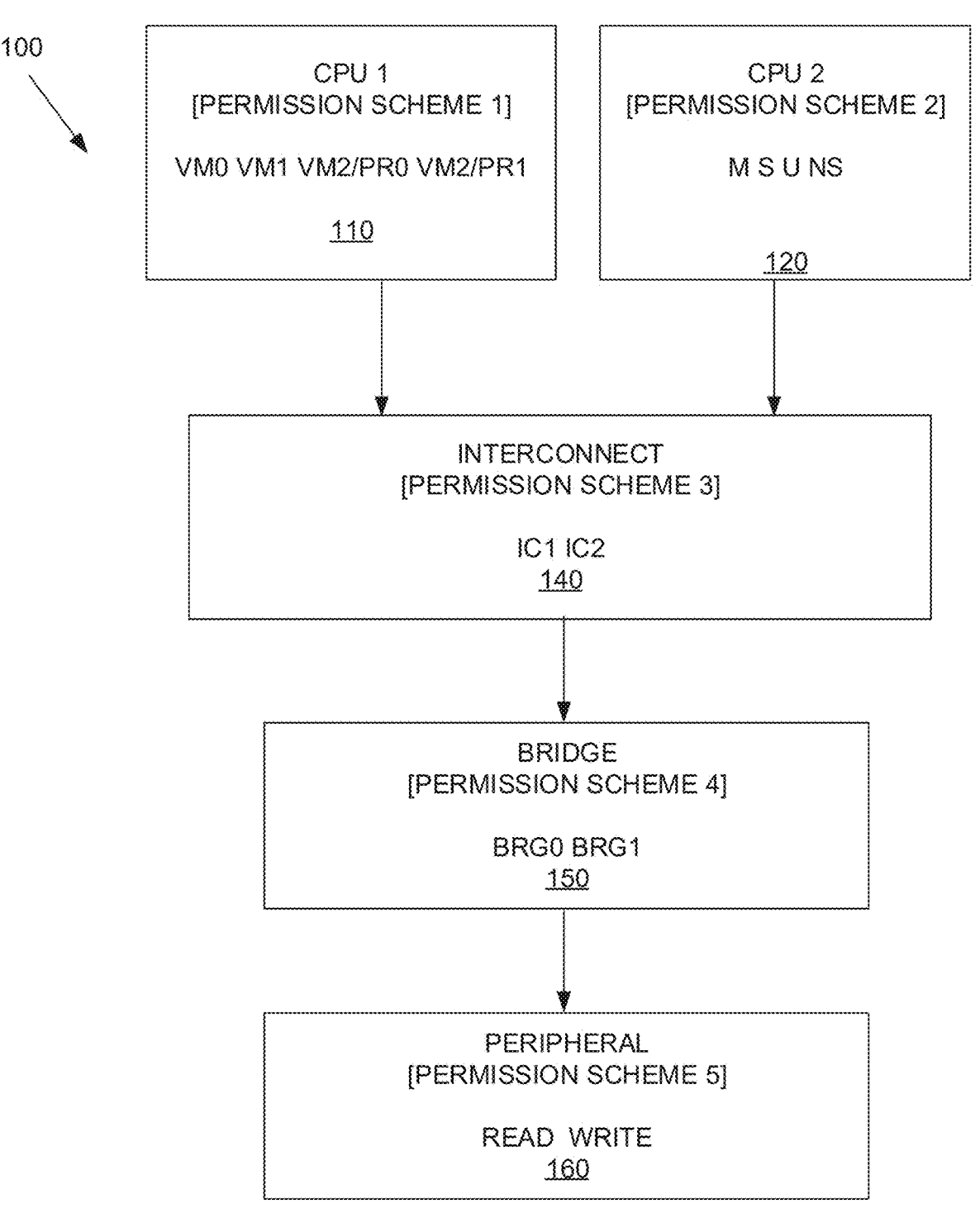
FIG. 1 is a diagram illustrating an example system in a package architecture in which different system elements operate according to different permission schemes, in accordance with various aspects described.

The present disclosure is described with reference to the attached figures. Similar components in various figures may be represented by similar reference characters. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

In systems that implement safety-related functions and/or security functions it is often desirable to segregate multiple software entities and control access to safety or security relevant memory or memory mapped registers on a software entity basis. Shared memory resources may include protection features that allow or prevent access to the resource based on a permission identifier associated with a bus access transaction. The permission identifier indicates a privilege level of a given permission scheme (e.g., privilege level user (U) of a RISC-V permission scheme).

As microcontrollers become more complex different central processing unit (CPU) types (e.g., ARM, RISC-V, TriCore, and so on) may be integrated in the same microcontroller to improve performance in terms of power consumption, speed, and processing capacity. Moreover, when multiple silicon dice are integrated into an SIP, the multiple dice may include different types of CPUs, may be sourced from different vendors, and/or may be taped out at different times.

FIG. 1 is a block diagram of an architecture 100 having five interconnected system elements, each with a different permission scheme. A first CPU 110 having a first permission scheme and a second CPU 120 having a second permission scheme share access to a peripheral device 160. The CPUs 110,120 generate bus access transactions, which include requests to read or write data with respect to the peripheral device 160. Access to the peripheral is controlled based on the privilege level of all system elements through which a bus access transaction has passed. As illustrated in FIG. 1, bus access transactions generated by the first CPU 110 and the second CPU 120 are routed through a local interconnect 140 having a third permission scheme to a bridge 150 having a fourth permission scheme. The bridge 150 spans between dies in the architecture. The peripheral device 160 has its own permission scheme.

Different types of CPUs often have different and incompatible permission schemes. In the example of FIG. 1 the first CPU 110 has four different privilege levels: virtual machine (VM)0, VM1, VM2 with protection register set (PR)0, and VM2 with PR1. The second CPU includes four privilege levels machine (M), supervisor(S), user (U), and non-secure mode (NS). The interconnect 140 has two privilege levels IC1, IC2. The bridge 150 has privilege levels BRG0 and BRG1. The peripheral permission scheme defines which system elements may have read access to the shared resource and which system elements may have write access to the shared resource. These different types of read or write access are referred to herein as a privilege or permission level and are indicated by a permission identifier.

It can be seen in FIG. 1 that the number of potentially incompatible permission schemes may increase quickly as the architecture becomes more complex. When multiple dice are combined such that they share or bridge a common interconnect, access protection based on privilege levels must be maintained across the multiple dice system. Access control mechanisms implemented in multiple dice architectures should be able to handle system elements (e.g., CPUs, interconnects, bridges, peripherals, and so on) having incompatible permission schemes. Preferably such mechanisms would allow for upgrades to system elements and the addition of system elements without requiring redesign for the alignment of permission schemes. Further, in some systems, certain sub-systems are used by only a limited number of software entities and implementing full access protection for these sub-systems may incur high costs in terms of configuration area.

Described herein are systems and methods that translate permission identifiers between different permission schemes. Translator circuitry may be placed at the boundary between a source system element and a destination system element to replace a source permission identifier encoded in a bus access transaction with a destination permission identifier indicating a privilege level of the destination permission scheme. This destination permission identifier is understood by the destination device without modification to the destination device's permission scheme. This allows for seamless permission/privilege protection across the entire system.

Figure 2:
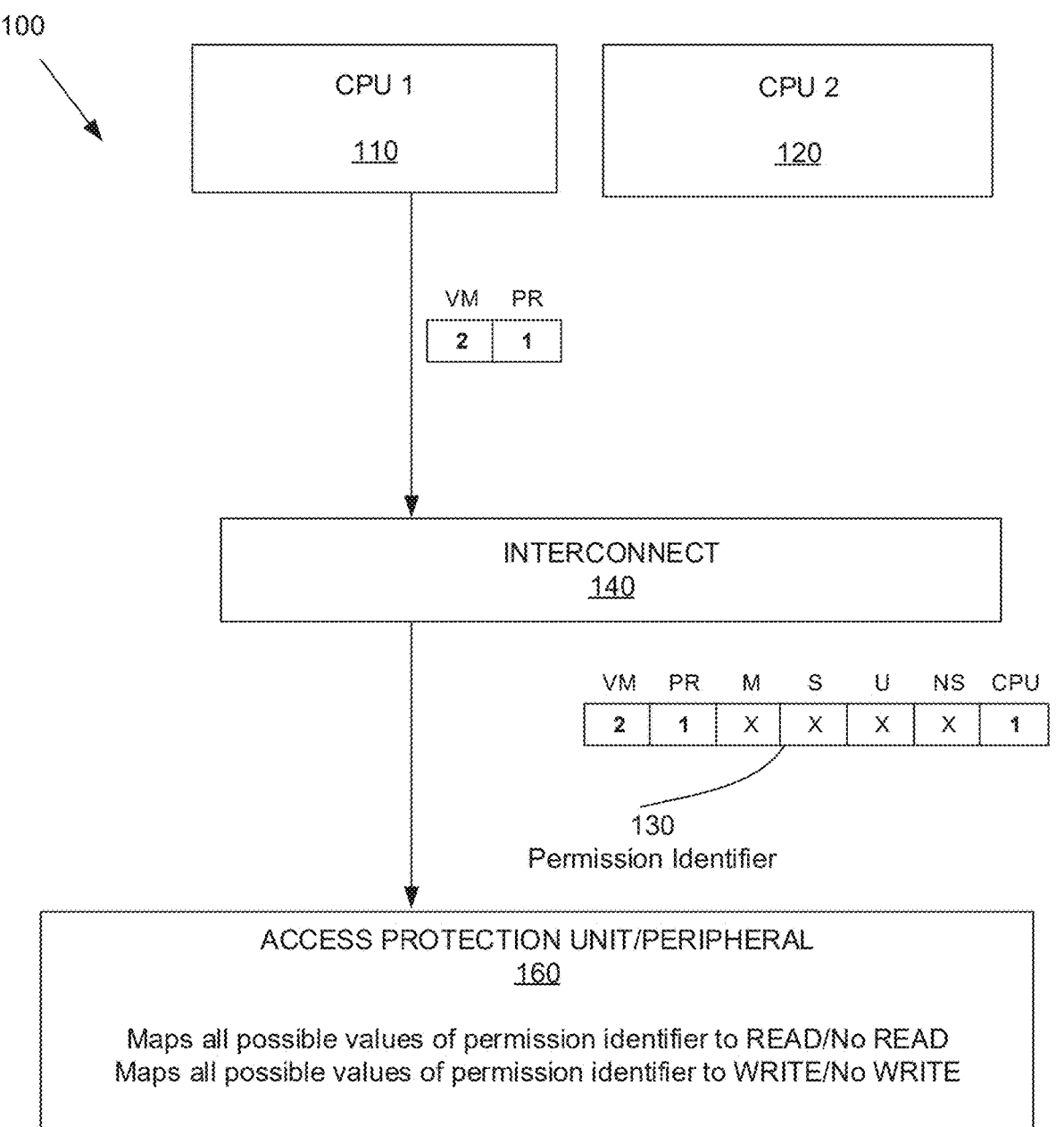
FIG. 2 is a diagram illustrating processing of a bus access transaction using permission identifier having attributes for all system permission scheme levels, in accordance with various aspects described.

FIG. 2 illustrates processing of a bus access transaction generated by the first CPU 110 with privilege level VM2/PR1 and directed to the peripheral 160. The bus access transaction is carried by an interconnect 140 that carries data associated with multiple fields of a bus access transaction. The fields include data indicating, for example, a source, a destination such as a memory or register location, a read or write command, and a permission identifier 130. The example of FIG. 2 illustrates a permission scheme extension technique in which the permission identifier of a bus access transaction is extended to include fields for privilege level identifiers for all the system elements through which a bus access transaction may pass. Thus, the permission identifier 130 has 2 fields for encoding a virtual machine and protection set register for the first CPU 110, four fields for encoding the four different privilege levels (M,S,U,NS) for the second CPU 120, and one field (CPU) that indicates which CPU is the source of the bus access transaction. The field values are initially set to a default value indicated as X.

When a second virtual machine associated with the second register set of the first CPU 110 generates the bus access transaction, the interconnect 140 sets the values in the first two fields of a permission identifier 130 to indicate VM2/PR0 and the value in the third to last field to indicate CPU1. The access protection unit of the peripheral 160 controls access to the peripheral based on the value of the permission identifier 130.

With the permission identifier extension technique the physical configuration of the interconnect 140 (e.g., a number of conductors) is based on the number of permission identifier fields. As the number of incompatible permission schemes in a system increases, the size of the permission identifier and the corresponding interconnect resources necessary to carry the permission identifier also increases. Further, the access protection unit of the peripheral 160 may map each possible combination of permission identifier field values to a configuration bit that indicates if access is to be granted or rejected. In the illustrated example, there are 192 possible values of the permission identifier. This adds complexity to the initial configuration of the access protection unit and the processing performed by the access protection unit. Another drawback to the permission identifier extension technique is that it does not provide flexibility for adding system elements or privilege levels as such modifications may result in a system wide revision of the common bus structure. Further, rarely used system elements will have dedicated permission identifier fields that are seldom used, but have corresponding bus resources throughout the system.

Figure 3:
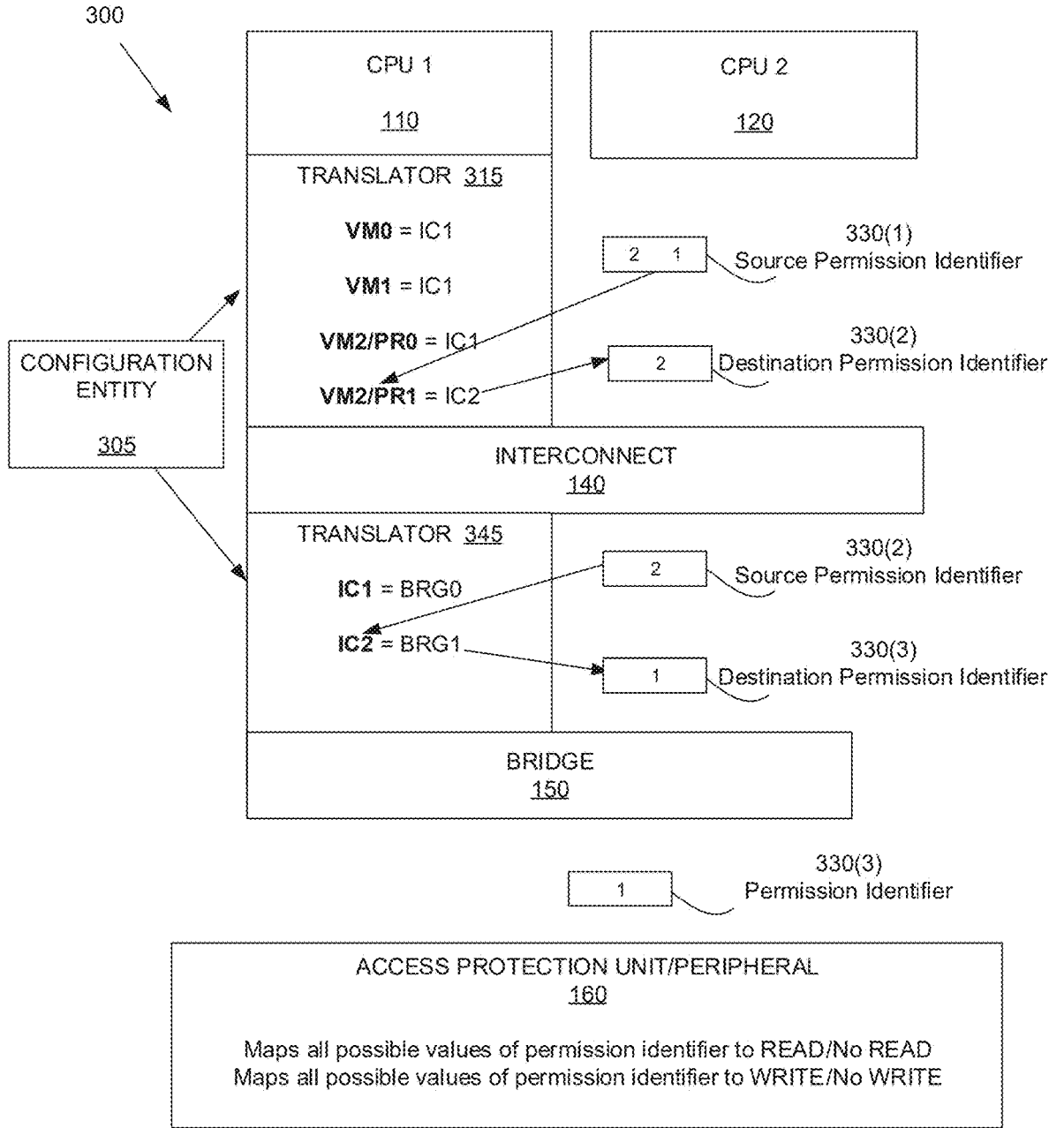
FIG. 3 is a diagram illustrating example processing of a bus access transaction using translator circuitries between system elements, in accordance with various aspects described.

FIG. 3 illustrates an example system architecture 300 with translator circuitry 315, 345 installed at the borders between system elements. In some examples, the translator circuitry includes a multiplexer or look-up table. Each translator circuitry maps each source permission identifier indicating a privilege level of the source permission scheme to a destination permission identifier indicating a privilege level of the destination permission scheme. The destination privilege level that is mapped to a given source privilege level provides the appropriate (e.g., equivalent) read or write access at the peripheral. A configuration entity (or entities) 305 may be used to set the mapping in each translator circuitry. As the hardware of the system evolves, the configuration entity 305 and translator circuitry 315,345 may be adjusted to change the source permission identifiers and destination permission identifiers mapped by a particular translator circuitry. As the software of the system evolves, the configuration entity 305 may be used to change the destination permission identifier mapped to a given source permission identifier or vice versa.

In the example of FIG. 3, a bus access transaction is generated by the first CPU 110 with privilege level VM2/PR1 and is directed to the peripheral 160. The first CPU 110 encodes the privilege level VM2 PR1 in permission identifier 330(1) which is referred to as a source permission identifier in this example because its value is set according to a permission scheme of the source of the bus access transaction. Translator circuitry 315 is coupled between the first CPU 110 and the interconnect 140. The translator circuitry 315 is configured to replace the source permission identifier 330(1) with a destination permission identifier 330(2) (e.g., IC2) mapped to the source permission identifier.

It is noted that this replacement of the source permission identifier with a destination permission identifier can be distinguished from the extension technique illustrated in FIG. 2 because there is not a separate field or bus conductor associated with the destination permission identifier. Instead, the values encoding the source permission identifier are changed to encode the destination permission identifier. In other words, when the bus access transaction is received by the interconnect, the source permission identifier is no longer encoded in or carried by the permission identifier. The same bus resources are used to carry permission identifiers from all the permission schemes in the system.

In the example of FIG. 3 the translator circuitry replaces a permission identifier that encodes a privilege level of a source permission scheme (e.g., VM2/PR1) with a permission identifier that encodes a privilege level of a particular source permission scheme (e.g., IC). In other examples, the translator circuitry may map a source permission identifier to an arbitrary, default, or generic privilege level indicator, such as an integer value selected from a set of integer values, which are understood as indicative of a privilege level by the destination system element. In some examples, the arbitrary, default, or generic privilege level indicator may be a system-wide indicator, understood by all system elements as indicating a certain privilege level.

The interconnect 140 receives the bus access transaction with the destination permission identifier 330(2) and is able to process the bus access transaction based on its own privilege level IC2 without the need to interpret the permission identifier generated by the first CPU. The interconnect 140 outputs the bus access transaction with the permission identifier 330(2) (now a source permission identifier) to the translator circuitry 345. The translator circuitry 345 replaces the source permission identifier indicating IC2 with the mapped destination permission identifier 330(3) which indicates BRG1. The bridge 150 outputs the bus access transaction with the permission identifier 330(3) to the peripheral 160. The access protection of the peripheral controls access to its resources based on the value of the permission identifier 330(3), which in this example may have one of two values BRG0 or BRG1. Recall that in the extension technique of FIG. 2, many more values of the permission identifier needed to be interpreted by the protection unit of the peripheral.

Figure 4:
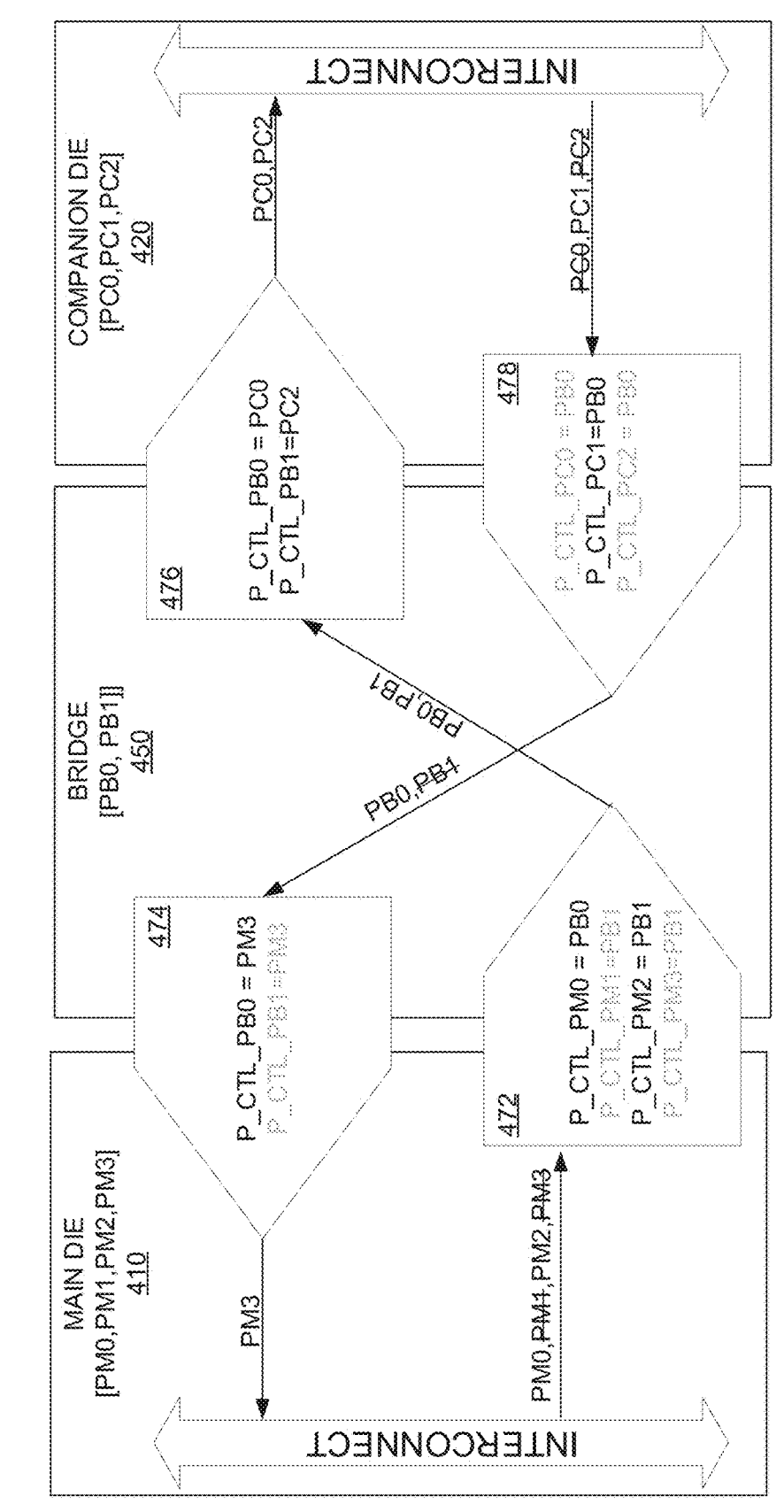
FIG. 4 is a diagram illustrating example processing of a bus access transaction using translator circuitries between system elements, in accordance with various aspects described.

FIG. 4 illustrates a multiple dice architecture 400 in which a main die 410 and a companion die 420 are connected by a bridge 450. In the architecture 400, translator circuitry is not placed at every boundary between system elements in the architecture. Rather, self contained groups of system elements (e.g., system elements of the main die 410 or the companion die 420) may communicate with one another without permission translation. Translation circuitry may be positioned at boundaries between these groups or realms to simplify integration of the architecture 400.

In the example of FIG. 4, the main die 410 communicates with the rest of the architecture 400 via an interconnect according to a permission scheme with four privilege levels (PM0-PM3). The companion die 420 communicates with the rest of the architecture via an interconnect according to a permission scheme with three privilege levels (PC0-PC2). The bridge 450 operates according to a permission scheme with two privilege levels (PB0, PB1). The bridge's access protection prevents PM1, PM3, PC0, and PC2 from entering the bridge.

Two translator circuitries are installed at each boundary between the bridge 450 and a die 410 or 420. As will be described in more detail in FIG. 5, each translator circuitry includes permission control registers (P_CTL), each mapped to a source permission identifier. For example, the permission control register selected by source permission identifier PB0 in translator circuitry 474 is indicated as P_CTL_PB0. Each permission control register stores a destination permission identifier that is mapped to its associated source permission identifier. Permission register P_CTL_PB0 in translator circuitry 474 stores destination (main die) permission identifier PM3. Permission control register for bridge privilege level PB1 P_CTL_PB1 stores destination permission identifier PM3 as well. This permission control register is shown in grey because, in this particular example, no bus access transactions from the companion die 420 to the main die 410 will include a permission identifier PB1.

Translation circuitry 472 includes a permission control register for each of the four privilege levels of the main die. Each permission control register stores a bridge permission identifier mapped to its associate main die permission identifier. Permission control registers for PM1 and PM3 are shown in grey because, in this particular example, bus access transactions including those permission identifiers are excluded from entering the bridge 450 by access protection associated with the bridge. Translation circuitry 476 includes a permission control register for each bridge privilege level. It can be seen that in translation circuitry 476 bridge privilege level PB0 is mapped to companion die privilege level PC0 and bridge privilege level PB1 is mapped to companion die privilege level PC2.

Translation circuitry 478 includes a permission control register for each of the three privilege levels of the companion die. Each permission control register stores a bridge permission identifier mapped to its associate companion die permission identifier. Permission control registers for PC0 and PC2 are shown in grey because, in this particular example, bus access transactions including those permission identifiers are excluded from entering the bridge 450 by access protection associated with the bridge.

A bus access transaction from the main die indicating a privilege level PM0 is translated by translator circuitry 472 into a bus access transaction indicating a privilege level PB0 and a bus access transaction indicating a privilege level PM2 is translated into a bus access transaction indicating a privilege level PB1. Translator circuitry 476 translates a bus access transaction output by the bridge indicating a privilege level PB0 into a bus access transaction indicating a privilege level PC0 and a bus access transaction indicating a privilege level PB1 is translated into a bus access transaction indicating a privilege level PC2. In this manner main die privilege level PM0 is translated to companion die privilege level PC0 and privilege level PM2 is translated to PC2.

A bus access transaction from the companion die indicating a privilege level PC1 is translated by translator circuitry 478 into a bus access transaction indicating a privilege level PB0. Translator circuitry 474 translates a bus access transaction output by the bridge indicating a privilege level PB0 into a bus access transaction indicating a privilege level PM3. In this manner companion die privilege level PC1 is translated to main die privilege level PM3.

Translator circuitry may not be used within the main die 410 or companion die 420 if the privilege schemes of the system elements on the respective die have been already integrated. The values stored in the permission control registers of translator circuitry 472 and 474 may be set by a software designer that is integrating the main die 410 into the architecture 400. The values stored in the permission control registers of translator circuitry 476 and 478 may be set by a software designer that is integrating the companion die 420 into the architecture 400.

For example, a software designer integrating the main die 410 into the architecture need only configure the mapping between the main die privilege levels and the bridge privilege levels. This is accomplished by storing the appropriate permission identifiers in the permission control registers of translation circuitry 472, 474. The software designer may inform the software designer integrating companion die 420 about which peripherals privilege level PB0 or PB1 should be allowed to reach. The main die software designed does not need to know which particular companion die privilege level will accomplish the appropriate peripheral access.

Figure 5:
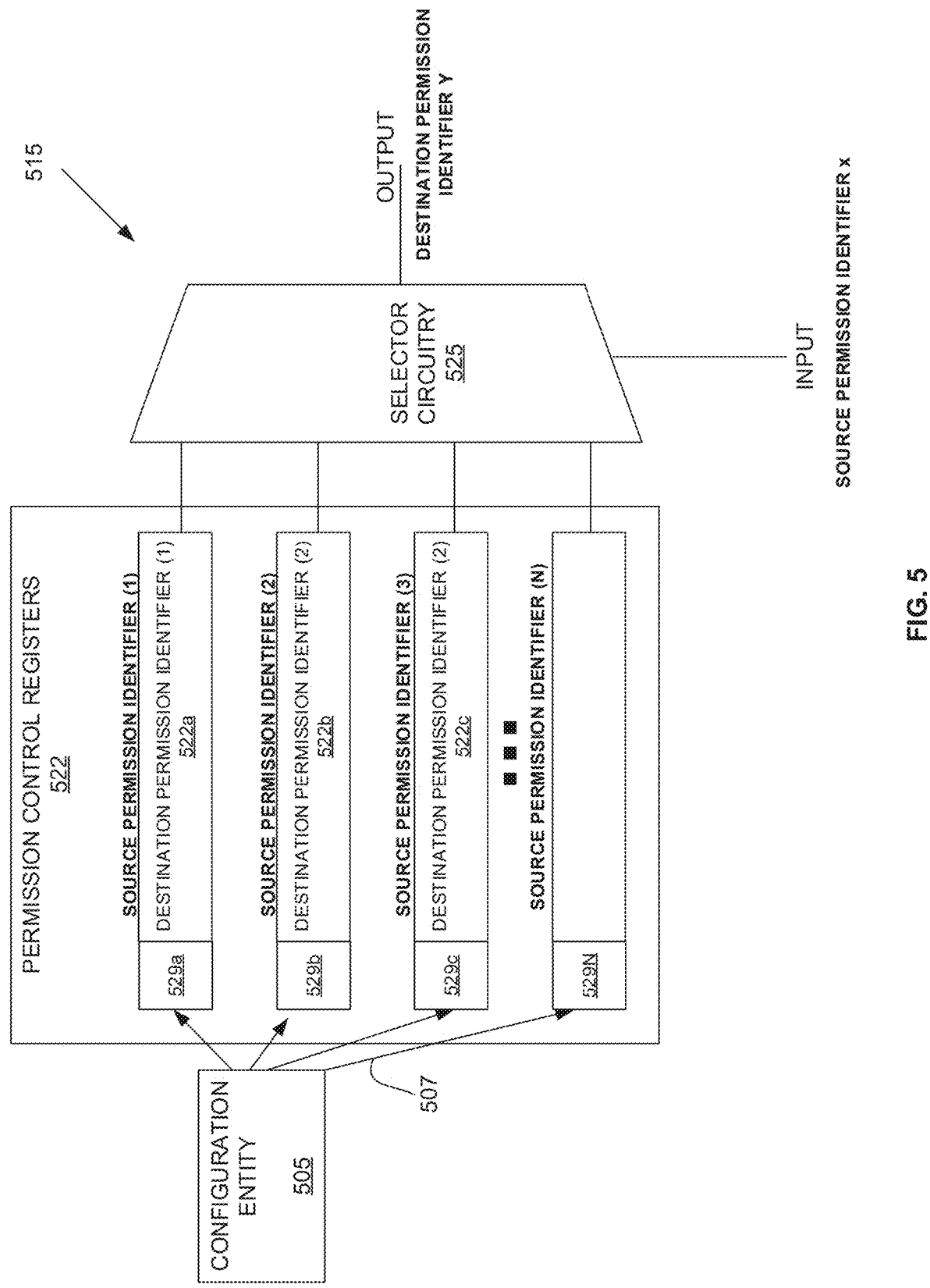
FIG. 5 is a block diagram of an exemplary translator circuitry, in accordance with various aspects described.

FIG. 5 illustrates an example translator circuitry 515 that includes a set of permission control registers 522 and selector circuitry 525. Each permission control register is connected to a different input of the selector circuitry 525. A particular permission control register is selected or addressed by the selector circuitry 525 based on a given source permission identifier value that is received at a selection input of the selector circuitry. The source permission identifier values that select each permission control register may be configured individually when the source system element is designed or integrated into an SIP. The source permission identifiers mapped to the permission control registers may encompass all possible source permission identifier values. In the illustrated example, the source system element has three different source permission identifier values. The translator circuitry 515 may include an arbitrary number N of permission control registers as shown in FIG. 5, some of which may not be used in every implementation of the translator circuitry 515.

A destination permission identifier is stored in each permission control register. To accomplish a mapping of source permission identifier x to destination permission identifier y, destination permission identifier y is stored in the permission control register selected by source permission identifier x. In the illustrated example, there are two different destination permission identifiers. Source permission identifier (1) is mapped to destination permission identifier (1) and source permission identifiers (2) and (3) are mapped to destination permission identifier (2). Thus, destination permission identifier (1) is stored in permission control register 522a which is selected by source permission identifier (1). Destination permission identifier (2) is stored in permission control registers 522b, 522c which are selected by source permission identifier (2) and source permission identifier (3), respectively. The destination permission identifier stored in a selected permission control register is output by the selector circuitry.

The permission control registers 522 may be memory mapped and access protected based on the system elements they are connected to. For example, the permission control registers of translator circuitry 315 may be memory mapped as related to the interconnect 140 so that access to the permission control registers is limited to entities that may access memory associated with the interconnect. Some constraints may be placed on values that may be stored in the permission control registers 522. For example, a value being stored in a permission register may be compared to a set of all possible permission control identifiers and if the value is not an element of the set, an error may be flagged and/or the value may be prevented from being written to the permission control register.

A configuration entity 505 is configured to populate the permission control registers 522 with the appropriate destination permission identifiers. In some examples, the configuration is a hypervisor or other trusted software entity. In some examples, the permission control registers include access protection circuitry 529 that evaluates a permission identifier in a permission control register setting transaction 507 presented by the configuration entity 505. The access protection circuitry 529 may enforce some authorization criteria for changing the content of a permission control register. For example, in order to change the content of a permission control register, the configuration entity must have a higher privilege level than the privilege level indicated by the source permission identifier that selects the permission control register.

When a bus access transaction is input to the translator circuitry 515, the selector circuitry 525 is controlled by the source permission identifier in the bus access transaction to output a destination permission identifier. In some examples, physical conductors associated with the bus or interconnect are connected at an input of the translator circuitry 515 and the values carried by the conductors select a permission control register whose values (e.g., a mapped destination permission identifier) are carried by bus conductors connected to an output of the translator circuitry 515.

FIG. 6 is a flow diagram of a method 600 for processing a bus access transaction that originates in a source system element having a source permission scheme and is received for processing by a destination system element having a destination permission scheme. System elements include CPUs, interconnects, bridges, and any other device capable of processing a bus access transaction. The method 600 may be performed by the system architecture 300 of FIG. 3 or 400 of FIG. 4. The method includes, at 610, receiving a bus access transaction from a source system element. The receiving may be performed by way of bus or interconnect related conductors that carry bit values corresponding to the bus transaction. The bus access transaction includes a source permission identifier indicative of a source permission identifier. Bits corresponding to the source permission identifier may be carried by a subset of the bus or interconnect related conductors.

The method includes, at 620, selecting a destination permission identifier based on a mapping between respective source permission identifiers and respective destination permission identifiers. The selecting may be performed by way of translator circuitry (e.g., circuitry 515 of FIG. 5) or any other mapping means including multiplexors or lookup tables. The method includes, at 630, providing a modified bus access transaction that includes the selected destination permission identifier to a destination system element.

In some examples, the method includes replacing the source permission identifier with the selected destination permission identifier in the modified bus access transaction. In some examples, the destination permission identifier belongs to a set of arbitrarily selected integers, each of which indicate a particular type of read or write access. In some examples, the destination permission identifier belongs to a set of permission identifiers associated with the destination system element.

FIG. 7 is a flow diagram outlining an example method 700 for translating permission identifiers in a bus access transaction. The method may be performed, for example, by translator circuitry 515 of FIG. 5. In other examples, the method may be performed by a processor executing stored instructions. The method 700 includes, at 710, providing a mapping of respective destination permission identifiers and respective source permission identifiers. The mapping may be provided by storing respective destination permission identifiers in respective permission control registers, where each permission control register is associated with a source permission identifier. In some examples, the method 700 includes protecting each permission control register against modification by a permission control register setting transaction that includes a permission identifier indicating a lower or equivalent privilege level as compared to the source permission identifier associated with the permission control register.

At 720, a source permission identifier of a bus access transaction is received. This operation may be performed by a selector circuitry, such as a multiplexor (see, e.g., 525 of FIG. 5). The source identifier may be input at a selection input of the selector circuitry that selects one of the permission control registers.

A modified bus access transaction that includes a destination permission identifier is provided at 730. The destination permission identifier is mapped to the source permission identifier. The destination permission identifier that is provided in 730 may be a destination permission identifier stored in a permission control register that is selected by a source destination permission identifier input to the selection input of selector circuitry. In some examples, the method includes replacing the source permission identifier with the destination permission identifier in the bus access transaction.

As can be seen from the foregoing description, the disclosed systems, methods, and circuitries allow for seamless translation between permission schemes with different numbers of privilege levels. A system may be partitioned into different realms with changes in permission schemes within a realm not affecting the implementation of other realms. This allows for area optimization. A system integrator need only configure the translator circuitry with the permission identifiers of their system element and the permission identifiers of the system element immediately adjacent to their system element. It is no longer necessary for each system integrator to be cognizant of all permission schemes in the entire system. This allows for reduction of complexity for the system integrator.

EXAMPLES

Example 1 is a processing system, includes a source system element characterized by a plurality of source privilege levels; a destination system element characterized by a plurality of destination privilege levels; and translator circuitry coupled between the source system element and the destination system element. The translation circuitry includes an input and an output. The input is coupled to the source system element that inputs a bus access transaction, where the bus access transaction includes a source permission identifier indicating a source privilege level. The output coupled is to the destination system element. The output provides a modified bus access transaction in which the source permission identifier is replaced with a destination permission identifier indicating a destination privilege level mapped to the source privilege level.

Example 2 includes the subject matter of example 1, including or omitting optional elements, wherein the translator circuitry includes a multiplexer or look-up table.

Example 3 includes the subject matter of example 1, including or omitting optional elements, wherein the translator circuitry includes a plurality of permission control registers, each permission control register associated with a source permission identifier configured to store a destination permission identifier and a selector circuitry. The selector circuitry includes the output coupled to the destination system element, the output configured to provide the destination permission identifier of the bus access transaction; a plurality of respective selection inputs coupled to respective permission control registers of the plurality of permission control registers; and a selection input coupled to the source system element, the selection input configured to receive the source permission identifier of the bus access transaction.

Example 4 includes the subject matter of example 3, including or omitting optional elements, wherein each permission control register includes access protection circuitry that protects against modification by a permission control register setting transaction that includes a permission identifier indicating a lower or equivalent privilege level as compared to the source permission identifier associated with the permission control register.

Example 5 includes the subject matter of any of examples 1-3, including or omitting optional elements, wherein the destination permission identifier belongs to a set of arbitrarily selected integers, each of which indicate a particular type of read or write access.

Example 6 includes the subject matter of any of examples 1-3, including or omitting optional elements, wherein the destination permission identifier belongs to a set of permission identifiers associated with the destination system element.

Example 7 is a method, including receiving a bus access transaction from a source system element, the bus access transaction including a source permission identifier; selecting a destination permission identifier based on a mapping between respective source permission identifiers and respective destination permission identifiers; and providing a modified bus access transaction that includes the selected destination permission identifier to a destination system element.

Example 8 includes the subject matter of example 7, including or omitting optional elements, including replacing the source permission identifier with the selected destination permission identifier in the modified bus access transaction.

Example 9 includes the subject matter of any of examples 7-8, including or omitting optional elements, wherein the destination permission identifier belongs to a set of arbitrarily selected integers, each of which indicate a particular type of read or write access.

Example 10 includes the subject matter of any of examples 7-8, including or omitting optional elements, wherein the destination permission identifier belongs to a set of permission identifiers associated with the destination system element.

Example 11 is translator circuitry, including a plurality of permission control registers, each permission control register associated with a different source permission identifier and configured to store a destination permission identifier and a selector circuitry. The selector circuitry includes an output configured for coupling to a destination system element, the output configured to provide the destination permission identifier of a bus access transaction; a plurality of respective inputs coupled to respective permission control registers of the plurality of permission control registers; and a selection input configured for coupling to a source system element, the selection input configured to receive a source permission identifier of the bus access transaction.

Example 12 includes the subject matter of example 11, including or omitting optional elements, wherein each permission control register includes access protection circuitry that protects against modification by a permission control register setting transaction that includes a permission identifier indicating a lower or equivalent privilege level as compared to the source permission identifier that selects the permission control register.

Example 13 includes the subject matter of any of examples 11-12, including or omitting optional elements, wherein the destination permission identifier belongs to a set of arbitrarily selected integers, each of which indicate a particular type of read or write access.

Example 14 includes the subject matter of any of examples 11-12, including or omitting optional elements, wherein the destination permission identifier belongs to a set of permission identifiers associated with the destination system element.

Example 15 is a method, including providing a mapping of respective destination permission identifiers and respective source permission identifiers; receiving a source permission identifier of a bus access transaction; and providing a modified bus access transaction that includes a destination permission identifier, wherein the destination permission identifier is mapped to the source permission identifier.

Example 16 includes the subject matter of example 15, including or omitting optional elements, including replacing the source permission identifier with the destination permission identifier in the modified bus access transaction.

Example 17 includes the subject matter of example 15, including or omitting optional elements, including providing the mapping by storing respective destination permission identifiers in respective permission control registers, wherein each permission control register is associated with a source permission identifier.

Example 18 includes the subject matter of example 17, including or omitting optional elements, including protecting each permission control register against modification by a permission control register setting transaction that includes a permission identifier indicating a lower or equivalent privilege level as compared to the source permission identifier associated with the permission control register.

Example 19 includes the subject matter of any of examples 15-18, including or omitting optional elements, wherein the destination permission identifier belongs to a set of arbitrarily selected integers, each of which indicate a particular type of read or write access.

Example 20 includes the subject matter of any of examples 15-18, including or omitting optional elements, wherein the destination permission identifier belongs to a set of permission identifiers associated with a destination system element receiving the modified bus access transaction.

In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term encode when used with reference to some entity or value of an entity is to be construed broadly as encompassing any manner or technique for generating a data sequence or signal that communicates the entity to another component.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. The term derive should be construed to encompass computing or calculating the entity or value of the entity based on other quantities or entities. The term derive should be construed to encompass any manner of deducing or identifying an entity or value of the entity.

As used herein, the term indicate when used with reference to some entity (e.g., parameter or setting) or value of an entity is to be construed broadly as encompassing any manner of communicating the entity or value of the entity either explicitly or implicitly. For example, bits within a transmitted message may be used to explicitly encode an indicated value or may encode an index or other indicator that is mapped to the indicated value by prior configuration. The absence of a field within a message may implicitly indicate a value of an entity based on prior configuration.

As used herein, the term provide when used with reference to information or data or a signal encoding data is to be construed broadly as encompassing any manner of communicating the information, data, or signal encoding data either explicitly or implicitly. "Provide" should be construed to encompass transmitting a message that indicates the information or data, storing the information or data in memory accessible to the recipient of the providing, controlling electrical signals on conductors in a circuit to encode the information or data, and so on.

Although specific embodiments/examples/aspects have been illustrated and described herein, it will be appreciated by those of ordinary skill in the art that a variety of alternate and/or equivalent implementations may be substituted for the specific examples shown and described without departing from the scope of the present invention. This application is intended to cover any adaptations or variations of the specific examples discussed herein. Therefore, it is intended that this invention be limited only by the claims and the equivalents thereof.

It should be noted that the examples as outlined in the present document may be used stand-alone or in combination with the other methods and systems disclosed in this document. In addition, the features outlined in the context of an apparatus are also applicable to a corresponding method, and vice versa. Furthermore, all aspects of the methods and apparatus outlined in the present document may be arbitrarily combined. In particular, the features of the claims may be combined with one another in an arbitrary manner.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A processing system, comprising:
a source hardware device having a first permission scheme that includes a plurality of source privilege levels, wherein the source hardware device encodes a source privilege level as a source permission identifier in a bus access transaction;
a destination hardware device coupled to the first hardware device, the destination hardware device having a second permission scheme that includes a plurality of destination privilege levels, wherein the source privilege levels and the destination privilege levels differ from one another such that the first permission scheme is incompatible with the second permission scheme; and translator circuitry coupled between the source hardware device and the destination hardware device, the translator circuitry configured to receive the bus access transaction and replace the source permission identifier with a destination permission identifier mapped to the source permission level to generate a modified bus access transaction; and provide the modified bus access transaction to the destination hardware device;

wherein the destination hardware device is configured to receive the modified bus access transaction and process the modified bus access transaction based on the second permission scheme without interpreting the source permission identifier.

2. The processing system of claim 1, wherein the translator circuitry comprises a multiplexer or look-up table.

3. The processing system of claim 1, wherein the translator circuitry comprises a plurality of permission control registers, each permission control register associated with a source permission identifier configured to store a destination permission identifier; and a selector circuitry comprising a plurality of respective selection inputs coupled to respective permission control registers of the plurality of permission control registers; and a selection input coupled to the source hardware device, the selection input configured to receive the source permission identifier of the bus access transaction.

4. The processing system of claim 3, wherein each permission control register comprises access protection circuitry that prevents modification by a permission control register setting transaction that includes a permission identifier indicating a lower or equivalent privilege level as compared to the source permission identifier associated with the permission control register.

5. The processing system of claim 1, wherein the destination permission identifier belongs to a set of arbitrarily selected integers, each of which indicates a particular type of read or write access.

6. The processing system of claim 1, wherein the destination permission identifier belongs to a set of permission identifiers associated with the destination hardware device.

7. A method, comprising:

with translator circuitry, receiving a bus access transaction from a source system element, the bus access transaction comprising a source permission identifier, wherein the source permission identifier encodes one of a plurality of source privilege levels associated with a first permission scheme;

selecting a destination permission identifier based on a mapping between respective source permission identifiers and respective destination permission identifiers, wherein the destination permission identifier encodes one of a plurality of destination privilege levels associated with a second permission scheme, wherein the source privilege levels and the destination privilege levels differ from one another such that the first permission scheme is incompatible with the second permission scheme; and providing a modified bus access transaction that includes the selected destination permission identifier to a destination hardware device; and with the destination hardware device, processing the modified bus access transaction based on the second permission scheme without interpreting the source permission identifier.

8. The method of claim 7, comprising replacing the source permission identifier with the selected destination permission identifier in the modified bus access transaction.

9. The method of claim 7, wherein the destination permission identifier belongs to a set of arbitrarily selected integers, each of which indicate a particular type of read or write access.

10. The method of claim 7, wherein the destination permission identifier belongs to a set of permission identifiers associated with the destination hardware device.

11. Translator circuitry, comprising:

a plurality of permission control registers, each permission control register associated with a different source permission identifier and configured to store a destination permission identifier, wherein each source permission identifier encodes one of a plurality of source privilege levels associated with a first permission scheme and each destination permission identifier encodes one of a plurality of destination privilege levels associated with a second permission scheme, wherein the source privilege levels and the destination privilege levels differ from one another such that the first permission scheme is incompatible with the second permission scheme; and a selector circuitry comprising a plurality of respective inputs coupled to respective permission control registers of the plurality of permission control registers;

a selection input configured for coupling to a source hardware device, the selection input configured to receive a source permission identifier of a bus access transaction, wherein the selector is configured to select a destination permission identifier associated with the source permission identifier of the bus access transaction; and an output configured for coupling to a destination hardware device, the output configured to provide the selected destination permission identifier as part of a modified bus access transaction to the destination hardware device, such that the destination hardware device processes the modified bus access transaction without interpreting the source permission identifier.

12. The translator circuitry of claim 11, wherein each permission control register comprises access protection circuitry that prevents modification by a permission control register setting transaction that includes a permission identifier indicating a lower or equivalent privilege level as compared to the source permission identifier that selects the permission control register.

13. The translator circuitry of claim 11, wherein the destination permission identifier belongs to a set of arbitrarily selected integers, each of which indicate a particular type of read or write access.

14. The translator circuitry of claim 11, wherein the destination permission identifier belongs to a set of permission identifiers associated with the destination hardware device.

15. A method, comprising:

providing a mapping of respective destination permission identifiers and respective source permission identifiers, wherein each source permission identifier encodes one of a plurality of source privilege levels associated with a first permission scheme and each destination permission identifier encodes one of a plurality of destination privilege levels associated with a second permission scheme, wherein the source privilege levels and the destination privilege levels differ from one another such that the first permission scheme is incompatible with the second permission scheme;

receiving a source permission identifier of a bus access transaction; and providing, to a destination hardware device, a modified bus access transaction that includes a destination permission identifier mapped to the source permission identifier, such that the destination hardware device processes the modified bus access transaction without interpreting the source permission identifier.

16. The method of claim 15, comprising replacing the source permission identifier with the destination permission identifier in the modified bus access transaction.

17. The method of claim 15, comprising providing the mapping by storing respective destination permission identifiers in respective permission control registers, wherein each permission control register is associated with a source permission identifier.

18. The method of claim 17, comprising preventing modification of each permission control register by a permission control register setting transaction that includes a permission identifier indicating a lower or equivalent privilege level as compared to the source permission identifier associated with the permission control register.

19. The method of claim 15, wherein the destination permission identifier belongs to a set of arbitrarily selected integers, each of which indicates a particular type of read or write access.

* * * * *